United States Patent [19]
Price et al.

[11] Patent Number: 5,821,395
[45] Date of Patent: Oct. 13, 1998

[54] WASTE PROCESSING

[75] Inventors: Alan George Price, Dyfed; David Charles Wilson, Perthshire, both of United Kingdom

[73] Assignee: BP Chemicals Limited, England

[21] Appl. No.: 462,848

[22] Filed: Jun. 5, 1995

[30] Foreign Application Priority Data

Jun. 16, 1994 [GB] United Kingdom ............... 9412028

[51] Int. Cl.$^6$ .................. C07C 1/00; C07C 7/01; C01C 7/01
[52] U.S. Cl. .................. 585/241; 585/648; 201/25; 208/400; 423/240 R; 423/240 S; 423/241
[58] Field of Search ................... 585/241, 648; 201/25; 208/460; 423/240 R, 240 S, 241

[56] References Cited

U.S. PATENT DOCUMENTS

| 3,519,609 | 7/1970 | McConnel et al. ............ 260/88.2 |
| 3,901,951 | 8/1975 | Nishizaki .................... 260/669 R |
| 3,985,820 | 10/1976 | Albright et al. .............. 260/683 R |
| 4,721,824 | 1/1988 | McWilliams et al. .......... 585/448 |
| 4,982,027 | 1/1991 | Korff et al. ................ 585/241 |
| 5,100,643 | 3/1992 | Brna et al. ................ 423/240 R |
| 5,136,117 | 8/1992 | Paisley et al. ............... 585/241 |
| 5,288,934 | 2/1994 | de Broqueville .............. 585/241 |
| 5,306,475 | 4/1994 | Fichtel et al. ............... 423/210 |
| 5,354,930 | 10/1994 | Atkins et al. ................ 585/241 |
| 5,364,995 | 11/1994 | Kirkwood et al. ............. 585/241 |
| 5,401,481 | 3/1995 | Rochelle et al. .............. 423/331 |
| 5,481,052 | 1/1996 | Hardman et al. ............... 585/241 |
| 5,618,508 | 4/1997 | Suchenwirth et al. ........... 423/245.1 |
| 5,639,937 | 6/1997 | Hover et al. ................. 585/241 |
| 5,648,591 | 7/1997 | Donecker et al. .............. 588/205 |

FOREIGN PATENT DOCUMENTS

| 828159 | 8/1975 | Belgium . |
| 0502618 | 9/1992 | European Pat. Off. . |
| 0510800 | 10/1992 | European Pat. Off. . |
| 0512482 | 11/1992 | European Pat. Off. . |
| 2480287 | 10/1981 | France . |
| 2613721 | 10/1988 | France . |
| 2222267 | 11/1972 | Germany . |
| 3146194 | 5/1983 | Germany . |
| 3435622 | 10/1985 | Germany . |
| 3443722 | 6/1986 | Germany . |
| 3819699 | 8/1989 | Germany . |
| 48075680 | 10/1973 | Japan . |
| 53-021277 | 2/1978 | Japan . |
| 55-071789 | 5/1980 | Japan . |
| 57-209988 | 12/1982 | Japan . |
| 1108295 | 4/1968 | United Kingdom . |

OTHER PUBLICATIONS

Bradshaw, Kirshnan & Young, "Laboratory Testing of a Fluidized–Bed Dry Scrubbing Process For The Removal of Acidic Gases From a Simulated Incinerator Flue Gas", Report No. CETHA–TE–CR–89116, dated Apr. 1989.

Primary Examiner—Bekir L. Yildirim
Attorney, Agent, or Firm—Brooks Haidt Haffner and Delahunty

[57] ABSTRACT

This invention relates to a process for thermally cracking waste polymer(s) comprising chlorinated polymers in a reactor in the presence of a fluidizing gas and a fluidized bed of solid, particulate fluidizable material at a temperature from 350°–600° C. to cracked products comprising a mixed vapor of lower hydrocarbons which have a chlorine content of less than 50 ppm. In the process, the cracked products emerging from the fluidized bed are passed through one or more guard beds comprising calcium oxide or a compound capable of giving rise to calcium oxide under the reaction conditions maintained at a temperature in the range from 400°–600° C. in such a way that the chlorine content of the product is less than 50 ppm.

17 Claims, 1 Drawing Sheet

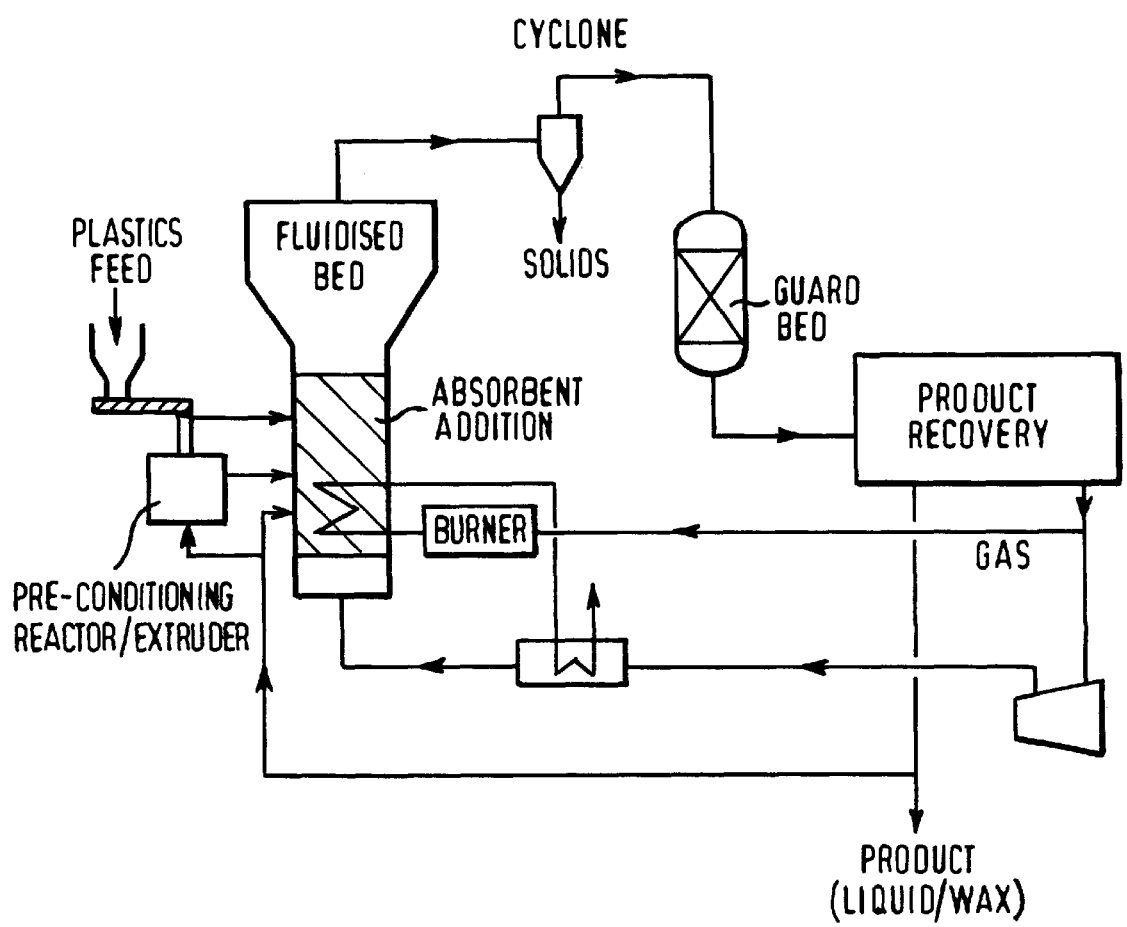

WASTE PROCESSING

The present invention relates to a method for processing waste products by pyrolysis into gaseous products which are capable of being further processed into valuable materials such as eg light olefins, paraffins, waxes or lubricating oils.

Waste products contemplated under the present invention are mainly plastics such as polyolefins, polyvinyl chloride (PVC), polystyrene etc, oily products such as plastics contaminated with oil. In many cases they can present a significant environmental hazard if placed on a land fill disposal site or if incinerated. These represent an underexploited source of (i) recyclable energy and (ii) new raw materials. Several attempts have been made to convert waste polymers into fuels, recyclable plastics and monomers which can eg be re-polymerised. One such method which has been investigated to a significant degree is the thermal degradation of such polymers. Thus, for example:

US-A-3519609 describes a process for the production of low viscosity synthetic waxes by heating high molecular weight polyolefins at 200°–400° C. in the absence of oxygen and in the presence of a saturated organic anhydride catalyst.

GB-A-1108295 describes a process for the production of wax-like ethylene (co)polymers by the thermal treatment of high molecular weight polymers in the absence of air and oxidising agents in which the high molecular weight polymers are mixed with a melt of already treated polyethylene (co)polymer.

FR-A-2613721 describes a process for the production of synthetic waxes by the thermal decomposition of polyethylenes and polypropylenes at 360°–500° C.; in a preferred embodiment the polyethylene or polypropylene is injected into a heated steel tube in the presence of steam.

FR-A-2480287 describes a process for the production of polyolefin wax by continuously extruding polyethylene through a heated reactor.

BE-A-828159 describes a process for preparing waxy polyethylenes by cracking polyethylene residues at 350°–385° C., e.g., by pumping a molten mixture through a heated coil.

JP-A-48075680 describes thermal decomposition of synthetic polymers by melting and transporting through varied conditions.

DE-A-2222267 describes converting polymer waste into fuels using a screw melt extruder.

JP-A-55071789 describes thermal cracking of plastics to obtain an oligomer and hydrocarbon oil in which the temperature of the reaction zone is regulated.

US-A-3901951 discloses a method of treating waste polymers by first melting the waste polymers at a temperature below 250° C. and then the melt is brought into contact with a particulate solid heat medium in a fluidized state maintained at a temperature of 350°–550° C. to pyrolyze the melt. The gaseous pyrolysis products are collected and condensed to recover a mixture of liquid hydrocarbons. The particulate solid can be fluidized using a gas such as air, steam or nitrogen, although air is preferred.

DE-A-3819699 adopts a different approach because of the disadvantages of conventional methods including the use of fluidized beds. The patent states that "of all the methods mentioned, only combustion in the rotary kiln has proved satisfactory" for converting waste polymers into coke briquettes.

One of the problems with all the prior art discussed above is that none of them provide a method of actually dealing with a mixed polymer waste e.g., a polyolefin and PVC, especially if such a mixture has to be turned into something more valuable than coke briquettes or simple incineration to gases which are vented into the atmosphere. In fact, even in the latter context, the venting of gases generated eg thermal degradation of PVC would result in significant quantities of hydrochloric acid (HCl) gas, which is one of the sources of 'acid rain', and hence is not enviromnentally friendly. One of the additional problems with mixed polymer wastes is that they contain other contaminants such as metals, paper, rocks, biomass and the like. None of the prior art processes describe any means of removing these in situ without resorting to any prior screening treatment or post-treatment of the products of pyrolysis.

Our own earlier filed and published EP-A-0 502 618 describes a process which produces a vaporous mixture of lower hydrocarbons from waste and/or fresh polymers by pyrolysis of polymer pieces in a fluidized bed of solid particulate material at temperatures in the range from 300°–690° C. This patent alleviates to some extent the problems of acidic vapours such as HCl generated by the pyrolysis of mixed polymers by treating the vaporous mixture of lower hydrocarbons with an alkaline compound such as calcium oxide used in the form of a guard bed.

It has now been found that, as a further development of the process described in our earlier EP-A-0 502 618, the problems of trapping HCl and chlorine generated during the processing of waste polymers in general can be substantially mitigated in an integrated process by operating the guard bed under critical conditions.

BRIEF DESCRIPTION OF THE DRAWING

The sole FIGURE is a schematic flowscheme of the process of the invention.

DESCRIPTION OF THE PREFERRED EMBODIMENTS

Accordingly, the present invention is a process for thermally cracking waste polymer(s) comprising chlorinated polymers in a reactor in the presence of a fluidizing gas and a fluidized bed of solid, particulate fluidizable material at a temperature from 350°–600° C. to cracked products comprising a mixed vapour of lower hydrocarbons which have a chlorine content of less than 50 ppm characterised in that the cracked products emerging from the fluidized bed are passed through one or more guard beds comprising calcium oxide or a compound capable of giving rise to calcium oxide under the reaction conditions maintained at a temperature in the range from 400°–600° C.

By the expression "waste polymer(s)" is meant here and throughout the specification plastics, whether virgin (scrap generated during processing of the plastics into the desired article) or waste after the plastics has performed its desired function and include inter alia:

i. polyolefins such as polyethylene, polypropylene and EPDM rubbers whether alone or in combination with one or more other plastics such as eg polystyrene, polyvinyl halides such as PVC or polyvinylidene halides, polyethers, polyesters, polyamides, scrap rubber and ABS (acrylonitrile/butadiene/styrene polymer);

ii. polymer sweepings; and iii. any of the above mixed with or contaminated with chemicals and/or petroleum products.

Such waste products may contain in addition, amounts of other materials not easily avoided during the collection thereof such as oil, water, labelling, closure systems; and residual contents of any waste products which have been used as containers.

By the expression "chlorinated polymers" is meant here and throughout the specification polymers which contain one or more atoms of chlorine in their structure such as eg polyvinyl chloride, polyvinylidene chloride, chloroprene and copolymers which contain one or more of the above polymers containing chlorine atoms.

The fluidized bed used suitably comprises solid, particulate fluidizable material of a size in the range of eg 100 to 2000 $\mu$m, preferably 150–500 $\mu$m. The fluidized bed is suitably of a material selected from one or more of quartz sand, silica, ceramics, carbon black, refractory oxides such as eg zirconia and calcium oxide. The bed is suitably comprised of at least 25% w/w, preferably at least 50% w/w of sand based on silica.

The fluidizing gas is suitably chosen so that it is incapable of oxidising the hydrocarbons in the cracked products under the reaction conditions. Examples of such a gas include inter alia nitrogen, the recycled gaseous products of the reaction and petrochemical or refinery fuel gas. The recycled gaseous products used are suitably components separated from the mixed vapours (emerging from the fluidized bed) via any downstream units used for processing the mixed vapours. Separation is suitably carried out at temperatures in the range from –50° to 100° C. Refinery fuel gas referred to above is a mixture comprising hydrogen and aliphatic hydrocarbons, principally $C_1$ to $C_6$ hydrocarbons. The fluidizing gas may also contain carbon dioxide, carbon monoxide and other gases over a wide range of concentrations. Heating or partial heating of the fluidized bed may be achieved by burning the excess gas and this heat may be introduced via the fluidizing gas by bringing it into the fluidized bed above the desired temperature of the fluidized bed reactor.

The rate of the polymer feed to the solid, particulate fluidized bed material during the thermal cracking stage is suitably less than 750 kg/m$^3$, preferably less than 200 kg/m$^3$, especially when this is carried out at about 520° C., to avoid failure of the bed by overloading by the polymer. Higher cracking temperatures will allow relatively higher loadings and conversely lower cracking temperatures will relatively reduce the permitted loading thresholds.

In addition, the viscosity of any liquid product entering the main fluidized bed needs to be controlled in such a way that it does not coalesce with the solid, particulate materials of the fluidized bed and thereby cause the bed to slump, that is to move into a region of unsatisfactory fluidization and homogeneity. Some means of controlling this viscosity are described later in this specification.

The fluidized bed is suitably operated at a temperature from 350°–600° C. preferably at a temperature from 400°–550° C.

Prior to the introduction of the waste polymers into the main fluidized bed for thermal cracking, such waste may be pre-conditioned in a preliminary stage to remove the bulk of chlorine. This stage may also be adapted to remove by selective degradation other unwanted parts of the waste polymers, eg parts containing sulphur and/or nitrogen and/or other halogens. The pre-conditioning stage consists of the waste polymer being heated to a temperature from 250°–450° C. for a duration ranging from 30 seconds to 4 hours. In this way, the amount of chlorinated waste from the process is minimised since the bulk of the chlorine is removed as HCl.

The pre-conditioning step is suitably carried out in a reactor located before the main fluidized bed which has a vent through which the gaseous HCl and other acid gases can pass; normally these gases are first cooled, the condensate returned to the reactor and the remaining gases are scrubbed with water or an aqueous alkali solution, eg sodium hydroxide solution. The temperature and duration of this step are a compromise to maximise the removal of chlorine, minimise the generation of hydrocarbon gas and sometimes to achieve reduction in viscosity to aid the processing. A preferred pre-conditioning method is to use a stirred tank at a temperature ranging from 250°–350° C. for a period of 10 minutes to 4 hours, more preferably from 275°–325° C. for 30 minutes to 90 minutes. A second preferred pre-conditioning method is to use a stirred tank at 300°–450° C. for 5 to 60 minutes, more preferably from 350°–400° C. for 5–60 minutes. A third preferred pre-conditioning method is to introduce heat by mechanical owrk to give a molten product in the temparature range of 300°–450° C. by, eg, the use of an extruder of a type typical in the processing of plastics but operated at 300°–450° C. Residence times in an extruder are of the order of 30–120 seconds. The use of the first method is particularly preferred when lower heat input and minimum generation of hydrocarbon gas is required. The use of the higher temperature ranges specified above in the other methods may lead to significant reduction in viscosity of the waste polymer. These other methods will be preferred when this feature is more significant to the overall process.

It may be desirable to introduce in this pre-conditioning stage one or more of the following products:

i) some of the thermally cracked products recycled from the fluidized bed as described above ii) residue from the distillation of the thermally cracked product from the fluidized bed as described above; distillation temperature used for this purpose can lie in the range from 100°–400° C. at atmospheric pressure or the equivalent thereof at other pressures; and iii) refinery product streams which are substantially liquid at that temperature chosen for the pre-conditioning stage.

These products (i)–(iii) above may be present in the feed to the pre-conditioning stage in an amount ranging from 5–95% w/w of the total feed inclusive of the waste polymer. The advantages of using these products are, for example:

a) further cracking of the product (ii) by passing the product through for a second time; this will make the overall percentage of the product from the waste polymer that is collected as distillate higher and therefore more desirable for some downstream applications;

b) ability to reduce the viscosity of the waste polymer (prior to the processing thereof in the main fluidized bed reactor by thermal cracking) in this pre-conditioning stage;

c) the ability to overcome the poor heat transfer characteristics of feeds with high viscosity and low thermal conductivity, by introducing the feeds at temperatures above that required in the pre-conditioning stage; some or all the necessary heat to this pre-conditioning stage could be introduced in this way.

Waste polymers may also be pre-heated before they enter the pre-conditioning stage or the main fluidized bed reactor used for thermal cracking thereof. One method of pre-heating is to use hot gas(es) for heating the solid waste polymer at about 80° C.

An alternative method is to melt the polymer at 150°–250° C. in a tank or a melt pot. A further alternative is to introduce heat by mechanical work on the waste polymer, eg by an extruder of a type used for plastics processing preferably to give a molten product in the temperature range from 150°–250° C. These pre-heating options have the added benefit that they would drive off any water associated with the waste polymers.

An optional addition or alternative to the pre-conditioning stage described above is for the thermally cracked products in the main fluidized bed to be brought into contact with a solid absorbent in a manner to obtain much higher utilization of the absorbent than could be achieved by using a guard bed alone, This step alone is not expected to achieve the low levels of acid contaminants in the cracked products required for the downstream applications. By the expression "contaminant(s)" as used herein and throughout the specification is meant compounds which contain one or more of halogens eg chlorine, nitrogen, oxygen and sulphur.

In this case, the solid absorbent is a material that will absorb acid gases, and is suitably calcium oxide, calcium carbonate, calcium hydroxide, magnesium oxide, magnesium hydroxide, magnesium carbonate, sodium carbonate and potassium carbonate or a combination of these. This solid absorbent is suitably used approximately stochiometrically to the expected total level and form of the contaminants, preferably in the range of 1 absorbent to 0.5–2 of the total contaminants. The absorbent is suitably added to the main fluidized bed reactor described above and in this case, is suitably of a particle size similar to those of the particles forming the fluidized bed. Thus, particle sizes of the solid absorbent are preferably in the range of 100–500 $\mu$m. It may be possible to use the attrition within the fluidized bed to reduce any larger particles of the solid absorbent present therein to the desired size in situ. Utilization of 30% or more of the absorbent material can be achieved in this way. Utilization is defined as the amount of CaO that is converted to $CaCl_2$ with the stoichiometric ratio of 1 CaO to 2 HCl. The chlorine measured in the spent absorbent is assumed to be all in the form of $CaCl_2$ for the purpose of this calculation. It is known that some of the chlorine will be in the form of Ca(OH)Cl and if all the chlorine was present in this form this would limit the utilization to 50%. The amount of calcium oxide, when used in the main fluidized bed, may vary over a wide range. However, to maintain good fluidization of the bed, it is preferable that at least 25% of the bed is of well rounded silica based sand. In such an operation, the economics of the process can be improved significantly by using the spent particulate, calcium oxide absorbent from the guard bed, as described below in this specification, which is likely to be predominantly unused.

The pre-conditioning and/or absorbent stages described above normally reduce the chlorine content of the waste polymer by more than 80% of its original value in the starting waste polymer before the thermally cracked products enter the guard bed.

The cracked products emerging from the fluidized bed (whether or not containing any absorbent) are fed to the guard bed containing calcium oxide or a compound capable of giving rise to calcium oxide under the reaction conditions to trap the acid contaminants and to render said products substantially free of all acid contaminants.

The material in the guard bed is a solid particulate absorbent and comprises calcium oxide (or a compound capable of giving rise to calcium oxide under the reaction conditions as described below) either alone or in combination with other alkaline materials which are also capable of absorbing acidic contaminants in the cracked products. The other alkaline materials usable in the guard bed suitably include inter alia magnesium oxide, magnesium hydroxide, magnesium carbonate, sodium carbonate and potassium carbonate and is preferably magnesium oxide. These materials can be used in combination with inert materials, for example silica sand, to improve the efficiency of or to reduce the pressure drop within the guard bed. Thus, the particulate solid absorbent comprising calcium oxide suitably has a mean particle diameter of 0.05–100 mm, preferably from 0.1–15 mm. The calcium oxide used in the guard bed is suitably one of medium to high reactivity, defined as >40° C. at 2 mins. by BSS 6463: Part 3 (1987), Method 4, and is preferably highly reactive with result at 2 mins. >60° C. The performance of calcium oxide can be enhanced by heating to 800° C. for at least 30 minutes. The guard bed may be in the form of a fixed bed, a fluidized bed or a moving bed, but is preferably a fixed bed. It may be operated in a co-or counter-current mode with the thermally cracked products from the fluidized bed reactor flowing in an up or a down direction. The guard bed is suitably operated at a temperature in the range from 400°–600° C., preferably from 450°–575° C. in order to maximise efficiency thereof, i.e. (i) to minimise the amount of contaminants, eg chlorine, in the products emerging from said guard bed, (ii) to avoid condensation of the hydrocarbon components of the thermally cracked products in the bed and (iii) to minimise coking. The residence time in the guard bed of the cracked products emerging from the fluidized bed reactor is suitably at least 0.3 seconds, preferably from 1–20 seconds. This is a surprisingly long residence time for a neutralisation reaction. This may be explained by the fact that the HCl is in equilibrium with chlorinated organic species and the long residence time is needed since reaction is only possible when the molecules are in their dissociated state of the equilibrium. This residence time is calculated on the basis of the space volume of the reactor and takes no account of the volume taken up by the absorbent. In other words, the residence time may be defined as the volume of calcium oxide in the bed divided by the total gaseous flow at the temperature of the bed in liters per second. Thus, for instance, for a bed size of 100 liters and a total gaseous flow of 280 normal liters/minute and at a reaction temperature of 540° C., the residence time will be:

$$\left\{ \frac{100 \times 60}{280} \right\} \times \left\{ \frac{293}{(273 + 540)} \right\} = 7.7 \text{ seconds}$$

The residence time required is linked to the temperature used. The efficiency of utilization of the absorbent is limited, amongst other factors, by the side reactions that take place with residues of polymers such as polyethylene terephthalate (PET) and degradation of hydrocarbons that lead to some coking. When the removal of the oxygenated carbon compounds, incidentally introduced with the PET in the waste polymer, is desirable, the side reactions which lead to CaO being converted to calcium carbonate are beneficial. Surprisingly, it has been found that the chlorine penetrates only upto 100–200 $\mu$m into the surface of the CaO particles when waste polymer mixtures typical of the plastics fraction of a municipal solid waste are being processed. Penetration to the centre of 1–3 mm CaO particles was observed when PVC alone was processed. If high conversions of CaO to calcium chloride and/or calcium carbonate are achieved, the particles in a fixed bed reactor bind together. The effect of all of these factors is to limit the conversion of CaO to calcium chloride to about 30% w/w and normally below 20% w/w.

It is preferable to use at least two such guard beds so as to enable feeding the thermally cracked products from the fluidized bed reactor alternately into these beds sequentially such that when the first guard bed has been in operation for a while, the feed is switched to the second guard bed whilst the used calcium oxide contents of the first bed are being replenished.

The products emerging from the guard bed are substantially free of chlorine (chlorine content no more than 50 ppm, preferably less than 20 ppm) and can be processed in the conventional manner to produce value added petrochemicals (either as such or after further processing such as steam cracking, oligomerisation, isomerisation etc) such as eg lower olefins, lubricants, waxes, gasoline/fuel and the like which are claimed and described in our prior published EP-A-0 502 618 and EP-A-0 567 292 and which are incorporated herein by reference.

One of the features of the process of the present invention is that it lifts from the fluidized bed the hydrocarbon products resulting from the thermal cracking leaving behind the contaminants such as eg chlorine, heavy metals etc in the fluidized bed. As a consequence, it is unnecessary to separate the various grades of wastes, especially various types of plastics into constituent groups before processing the waste. This will of course mean that the particulate solids in the fluidized bed may from time to time have to be removed and either replaced with a fresh charge or the contaminated solids are cleaned eg by combustion in a separate reactor under strongly oxidising conditions and the cleaned particulate solids are then recycled as a fresh charge to the fluidized bed as described previously.

Thus, it can be seen that the process of the present invention:
i) processes a mixed waste,
ii) separates in situ the contaminants from the hydrocarbons to meet the downstream specification,
iii) minimises production of spent solid absorbent,
iv) is versatile in respect of various end products that can be produced such as eg lower olefins, gasoline/fuel, lubricating oils etc.,
v) has a low gas production which is in line with the heating requirements of the process, and
vi) is very low in the conversion of aliphatics to aromatics.

The present invention is more specifically described with reference to the accompanying flow diagram and the following Examples.

EXAMPLE 1

This Example shows the need to keep the guard bed at the correct temperature/residence time relationship and the limited usage of the bed that is achieved before the chlorine levels are above 50 ppm and the relative high levels of calcium carbonate that are achieved.

A. A feed product was prepared for introducing into a fluidized bed for thermal cracking in a laboratory apparatus in the following manner to overcome the problems of particulate removal. Waste polymer containing the following post-consumer polymers, i.e. polyvinyl chloride (PVC, 2%), polyethylene terephthalate (PET, 3%), polystyrene (PS, 15%) and a mixture of polyethylene (PE) and polypropylene (PP) (80%, predominantly, PE) was fed to a fluidized bed reactor (100 mm internal diameter) containing of silica sand, Chelford 95 (1 kg, ex Hepworth Minerals & Chemicals Ltd) fluidized with nitrogen at 7 normal liters/min. and heated to between 500° and 530° C. A waxy product was formed which had a chlorine content of 1000 ppm. This formed the feed to the fluidized bed reactor where it was subjected to thermal cracking according to the invention.

B. The wax from step A above was melted (at about 100° C.) and fed to a fluidized bed reactor (100 mm internal diameter) charged with fresh sand as above and again heated to 500°–530° C. and fluidized with nitrogen at 4.4 normal liters/minute. The gaseous products resulting from thermal cracking in this reactor were passed through a fixed guard bed (25 mm internal diameter, 230 mm long zone of CaO with approximate residence time 0.6 seconds) containing 150 g of a high reactivity CaO, (FINE 6 ex Buxton Lime Industries Ltd) which had been sieved to a size between 1.0 and 2.8 mm particle diameter and had been treated in a furnace at 800° C. for at least 30 minutes prior to insertion into the guard bed. A pre-heat zone of the same temperature as the guard bed and similar residence time was used to ensure that the gaseous products of thermal cracking from the fluidized bed reactor entered the guard bed at the desired temperature (see Tables 1 and 2 below). The products emerging from the guard bed were cooled, collected and measured for chlorine content. Tables 1 and 2 below show the effect of temperature and collection rate on the chlorine levels in the product:

TABLE 1

| Temperature (°C.) | Chlorine (ppm) |
| --- | --- |
| 470 | 68 |
| 515 | 17 |
| 540 | 10 |

TABLE 2

Temperature of guard bed - 540° C.

| Collection rate (g/hr) | Chlorine (ppm) |
| --- | --- |
| 52 | 5 |
| 180 | 10 |
| 439 | 14 |

EXAMPLE 2

To further illustrate the temperature/residence time relationship the following test was carried out. A fluidized bed reactor (45 mm internal diameter) was filled with Redhill sand (80 g, ex Hepworth Minerals and Chemicals) sieved to 90–125 μm particle diameter and fluidized with nitrogen at 0.5 normal liters/minute. A guard bed as described in Example 1 above was used which gave a residence time of about 5 seconds. The results are tabulated below in Table 3.

TABLE 3

| Temperature (°C.) | Chlorine (ppm) |
| --- | --- |
| 400 | 11 |
| 450 | 7 |
| 500 | 9 |
| 550 | 6 |

EXAMPLE 3

In this Example the conversion of CaO to $CaCl_2$ is illustrated.

A fluidized bed reactor (100 mm internal diameter) was cleaned and charged with sand (2.5 kg) as in Example 1A above and heated to between 500° and 530° C. and fluidized with nitrogen at 7 normal liters/min. Waste polymer containing polyvinyl chloride (PVC, 2%), polyethylene terephthalate (PET, 3%), polystyrene (PS, 15%) and a mixture of polyethylene (PE) and polypropylene (PP) (80%, predominantly, PE) was added to the reactor. The gaseous thermally cracked products from the fluidized bed reactor were passed through a fixed guard bed (43 mm internal diameter, 230 mm length of CaO with approximate residence time of 1.1 seconds) containing 310 g of a high reactivity CaO, (FINE 6 ex Buxton Lime Industries Ltd) which had been sieved to 1.0–2.8 mm particle diameter and had been treated in a furnace at 800° C. for at least 30 minutes prior to insertion into the guard bed. A pre-heat zone of the same temperature as the guard bed and similar residence time was used to ensure that the gaseous thermally cracked products from the fluidized bed reactor entered the guard bed at the desired temperature of 500° C. The products emerging from the guard bed were cooled, collected and measured for chlorine content. The results are shown in Table 4 below.

TABLE 4

| Conv. of CaO to CaCl$_2$ (%) | Chlorine in Product (ppm) |
|---|---|
| 0.8 | 5 |
| 1.5 | 9 |
| 1.8 | 8 |
| 2.0 | 29 |
| 2.9 | 38 |

EXAMPLE 4

This Example illustrates that the quality of CaO used has a bearing on the amount of HCl that is absorbed before breakthrough.

HCl vapour was generated by bubbling nitrogen at 6.8 normal liters/minute through concentrated HCl. This vapour was passed through a guard bed of CaO at 500° C. at the residence times shown in Table 5 below. The following results (shown in Table 5 below) were obtained showing the importance of selecting the correct grade of CaO.

TABLE 5

| Reactivity (BS 6463:Part 3:1987 method 4 (°C. at 2 mins) | CaO (g) | Residence Time (Seconds) | Activated at 800° C. | Conv. of CaO to CaCl$_2$ before HCl breakthrough |
|---|---|---|---|---|
| 46 | 35 | 0.12 | NO | 1.2 |
| 46 | 35 | 0.12 | YES | 1.8 |
| >60 | 25 | 0.09 | NO | 7.7 |

EXAMPLE 5

This Example illustrates the operation of the guard bed at larger scale, to show the presence of CaCO$_3$ and the potential of high CaO to CaCl$_2$ conversion.

A fluidized bed reactor (30 cm internal diameter) was charged with silica sand (150 kg) sieved to between 125 μm and 500 μm and fluidized with 180 normal liters/minute nitrogen. The sand was heated to 485° C. A further 100 normal liters/minute nitrogen was introduced into the fluidized bed reactor with the waste polymer feed (containing a blend of a polymer with 0.2–0.7 % w/w chlorine and some PET and PS collected from households in Germany) fed at about 18 kg/hr and subjected to thermal cracking. The gaseous thermally cracked products from this fluidized bed reactor were passed through a guard bed set at 540° C. with 80 Kg of 6–12 mm pieces of a high reactivity calcium oxide (FINE 6 ex Buxton Lime Industries Ltd). Residence time in the guard bed was 7.7 seconds. Chlorine content of the resultant product emerging from the guard bed was 15 ppm. Inspection of the CaO absorbent at the entry to the guard bed with an electron microscope linked to an X-ray elemental detector showed that chlorine had penetrated to 200 μm but no further. This material upon analysis for the relevant components had a composition of 6% calcium chloride, 16% calcium carbonate and 1% coke.

The thermally cracked products collected consisted by weight of 16.7% gas; 60.4% waxy products and 23% liquids. The liquid fraction was 53% aromatics most of which can be attributed to the breakdown of polystyrene, eg 28% of this 53% was styrene; 10% ethyl benzene and 3.7% (x-methyl styrene. The exact level of polystyrene in the feed is not known but 15% is a typical figure for the plastics fraction of Municipal Solids Waste.

EXAMPLE 6

This Example illustrates the use of a stirred tank as a pre-conditioning stage to remove a substantial proportion of the HCl from the feed prior to cracking in a fluidized bed.

A 2-liter flask was charged with wax residue (400 g) from distilling the product from Example 5 above under vacuum conditions equivalent to 350° C. at atmospheric pressure. Waste polymer (100 parts by weight) used in Example 1 above was mixed and compounded with virgin bottle grade PVC (10 parts by weight) and the chlorine content of this mixture was determined by analysis to be 6.1% w/w. The mixture of polymers (200 g) was added to the flask over a 20 minute period. A condenser at 110° C. returned condensate to the flask; a water scrubber and a sodium hydroxide scrubber collected the HCl. The results are summarised in Table 6 below:

TABLE 6

| Expt | Temp (°C.) | Time (Mins) | % Chlorine left in polymer | Viscosity (cP) @ 260° C. 5s$^{-1}$ Final waste polymer/wax mix |
|---|---|---|---|---|
| a | 280 | 60 | 11 | 26,250 |
| b | 280 | 120 | 10 | 33,500 |
| c | 320 | 30 | 7 | 12,000 |
| d | 320 | 30 | 4.2 | 8,300 |

Hydrocarbon gas evolution was less than 1% w/w in all cases.

EXAMPLE 7

This Example illustrates the use of a stirred tank set up as a continues process as a pre-conditioning stage to remove a substantial proportion of the HCl from the feed prior to cracking in a fluidized bed.

Wax produced in Example 5 was distilled at 50 mbar with a top of column temperature of 250°–280° C. The wax residue of this distillation was melted and 680 g of this melt added to a stirred reactor which was maintained at 280° C. At time zero a flow of 270 g/hr was started which was 64% by weight of the above wax melt and 36% by weight of the polymer as used in Example 6. The volume was maintained at the same level as it had been with the 680 g of wax. This gives an average residence time in the vessel of about 2.5 hours. The following results were obtained:

TABLE 7

| Time Hrs | Calculated % of polymer in vessel | ppm Chlorine in vessel | Viscosity (cP) @ 260° C. |
|---|---|---|---|
| 1.25 | 14.2 | 2100 | 50 |
| 2 | 19.8 | 2200 | 600 |
| 2.75 | 24.0 | 2000 | ND |
| 3.25 | 26.2 | 2100 | 2450 |

ND - not determined

EXAMPLE 8

This Example illustrates the use of an extruder to remove substantial amounts of chlorine from the waste polymer in a pre-conditioning stage.

A mixture of virgin polymers of 10% bottle grade PVC, 50% high density polyethylene (HDPE) and 40% polypropylene (PP) all by weight was charged to an ZSK30 co-rotating twin-screw extruder made by Werner Pfleiderer at 4 kg/hr. The residence time in the extruder was measured at 80 seconds and the temperature of the melt exiting the extruder at 385° C. The product had an average chlorine content of 2100 ppm which represents about 4% w/w of the initial chlorine content of the mixed polymer feed. The viscosity at 260° C. and $5s^{-1}$ was 23,700 cP.

EXAMPLE 9

This Example illustrates the effect of adding CaO to the main fluidized bed in which the polymer is thermally cracked and shows the higher conversion of CaO to $CaCl_2$.

A feed product was prepared as in Example 1A but using high density polyethylene (HDPE) as the polymer feed and a waxy product so formed collected.

A clean fluidized bed reactor (100 mm internal diameter) was then charged with Chelford 95 sand (2.5 kg). A blend of the polymers comprising polyvinyl chloride (PVC, 2%), polyethylene terephthalate (PET, 3%), polystyrene (PS, 15%) and a mixture of polyethylene (PE) and polypropylene (PP) (80%, predominantly, PE) was coated with 1.5% w/w of the wax made from virgin HDPE described above. Thereafter, 1.6% w/w of 212–500 μm a high reactivity CaO (FINE 6 ex Buxton Lime Industries Ltd) which had been heated to 800° C. and stored in a desiccator was added to this polymer/wax mixture. The CaO stuck to the wax and remained well dispersed. This mixture was then charged to the fluidized bed reactor at rates ranging from 300– 550 g/hr. The conversion of the CaO was calculated from the amount of chlorine in the cracked hydrocarbon products collected and from the HCl in the gas stream passing through the collection stage. Conversions recorded were steady with time and polymer feed rate and ranged from 27–31% w/w.

We claim:

1. A process for preparing a mixed vapor of lower hydrocarbons having a chlorine content of less than 50 ppm which comprises thermally cracking at a temperature of from 350°–600° C. waste polymers containing chlorinated polymers in a reactor in the presence of a fluidizing gas and a fluidized bed of solid particulate fluidizable materials, and passing at a temperature of from 400°–600° C. the cracked products emerging from the fluidized bed through one or more guard beds comprising calcium oxide or a compound capable of giving rise to calcium oxide under the reaction conditions, the calcium oxide being of medium to high reactivity defined as >40° C. at 2 mins by BSS 6463: Part 3 (1987), Method 4; wherein the residence time of the cracked products in the guard beds is at least 0.3 seconds calculated on the basis of the volume of the calcium oxide reactor divided by the total gaseous flow through the reactor.

2. A process according to claim 1 wherein the fluidized bed is of a material selected from one or more of quartz sand, silica, ceramics, carbon black, refractory oxides.

3. A process according to claim 1 wherein the fluidizing gas is incapable of oxidising the hydrocarbons in the cracked products under the reaction conditions.

4. A process according to claim 1, claim 2 or claim 3 wherein the fluidized bed is operated at 400°–550° C.

5. A process according to claim 1 wherein the waste polymer is pre-conditioned in a preliminary stage to remove the bulk of chlorine prior to the introduction thereof into the fluidized bed for thermal cracking.

6. A process according to claim 5 wherein the pre-conditioning stage consists of the waste polymer being heated to a temperature from 250°–450° C. for a duration ranging from 30 seconds to 4 hours.

7. A process according to claim 6 wherein the pre-conditioning stage consists of the waste polymer being heated to a temperature from 250°–350° C. for a duration ranging from 10 minutes to 4 hours.

8. A process according to claim 6 wherein the pre-conditioning stage consists of the waste polymer being heated to a temperature from 300°–450° C. for 5 to 60 minutes.

9. A process according to claim 6 wherein the pre-conditioning stage consists of heating the waste polymer in an extruder of the type used in plastics processing operated at 300°–450° C.

10. A process according to claim 5 wherein one or more of the following products are introduced along with the waste polymer feed into the pre-conditioning stage:
   i) some of the thermally cracked products recycled from the fluidized bed
   ii) residue from the distillation of the thermally cracked product from the fluidized bed; and
   iii) refinery product streams which arc substantially liquid at the temperature chosen for the pre-conditioning stage.

11. A process according to claim 1 wherein a solid absorbent capable of absorbing acid gases is admixed with the solid particulate material of the fluidized bed.

12. A process according to claim 11 wherein the solid absorbent is selected from the group consisting of one or more of calcium oxide, calcium carbonate, calcium hydroxide, magnesium oxide, magnesium hydroxide, magnesium carbonate, sodium carbonate and potassium carbonate.

13. A process according to claim 1 wherein the cracked products emerging from the fluidized bed is passed through a guard bed which comprises in addition to calcium oxide one or more alkaline materials selected from the group consisting of magnesium oxide, magnesium hydroxide, magnesium carbonate, sodium carbonate and potassium carbonate.

14. A process according to claim 1 wherein the calcium oxide in the guard bed has a mean particle diameter of 0.05–100 mm.

15. A process according to claim 1 wherein the guard bed is in the form of a fixed bed, a fluidized bed or a moving bed.

16. A process according to claim 1 wherein the guard bed is operated at a temperature in the range from 450°–575° C.

17. A process according to claim 1 wherein the products emerging from the guard bed have a chlorine content of less than 20 ppm.

* * * * *

UNITED STATES PATENT AND TRADEMARK OFFICE
CERTIFICATE OF CORRECTION

PATENT NO. : 5,821,395

DATED : October 13, 1998

INVENTOR(S) : ALAN GEORGE PRICE ET AL.

It is certified that error appears in the above-identified patent and that said Letters Patent is hereby corrected as shown below:

Column 2, line 65, after "systems" delete ";" and insert --,-- therefor.

Column 4, line 36, change "that" to --the--.

Column 5, line 17, correct the spelling of "stoichiometrically".

Column 10, line 7, change "(x-methyl" to --α-methyl--.

Signed and Sealed this

Fourth Day of May, 1999

*Attest:*

Q. TODD DICKINSON

*Attesting Officer*   Acting Commissioner of Patents and Trademarks